Jan. 10, 1967 D. R. ELMORE 3,297,274
VARIABLE-RATE-TORQUE CONTROLLER
Filed March 11, 1965 2 Sheets-Sheet 1
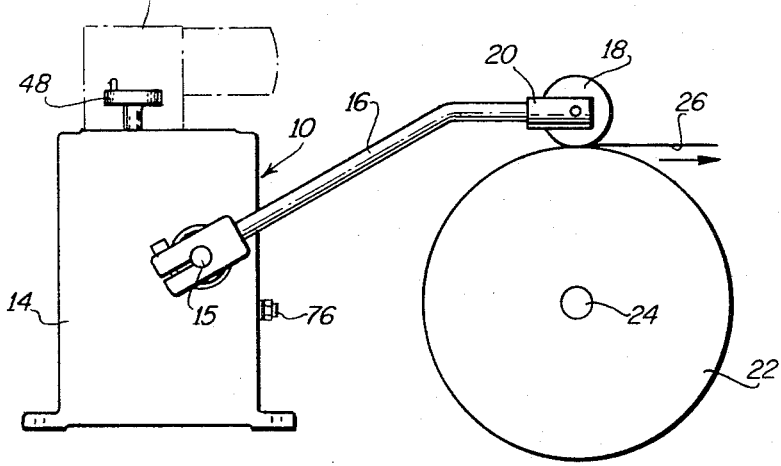
Fig_1
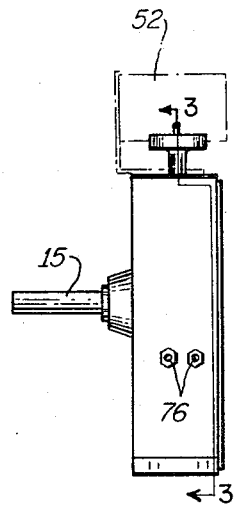
Fig_2
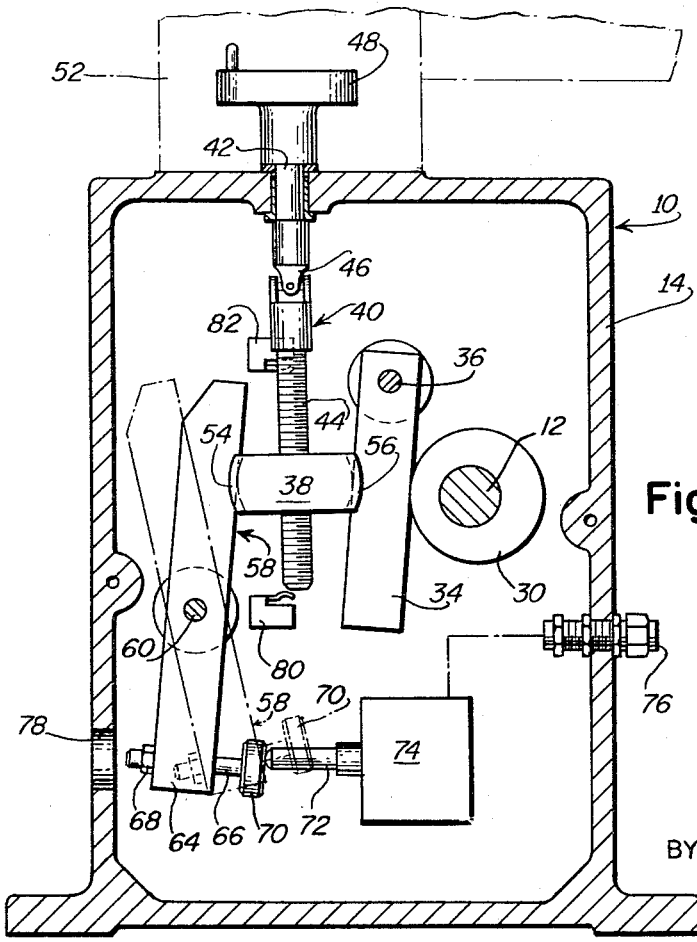
Fig_3
INVENTOR
DUANE R. ELMORE
BY
ATTORNEYS

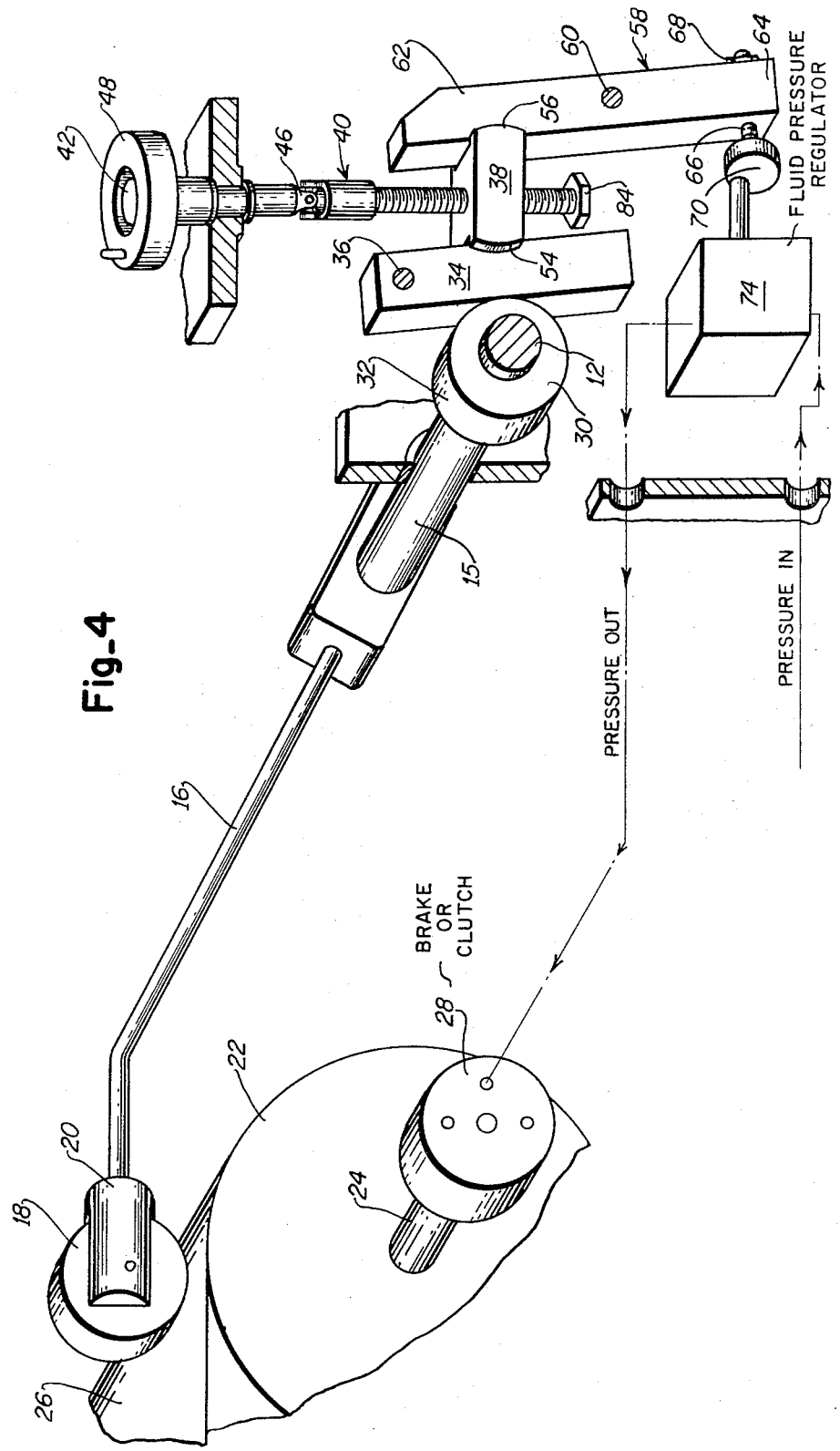

United States Patent Office 3,297,274
Patented Jan. 10, 1967

3,297,274
VARIABLE-RATE-TORQUE CONTROLLER
Duane R. Elmore, Tariffville, Conn., assignor to The Pneumatic Applications Company, Simsbury, Conn., a corporation of Connecticut
Filed Mar. 11, 1965, Ser. No. 438,965
5 Claims. (Cl. 242—75.45)

This invention relates to a control device for maintaining the desired tension in a web or sheet of flexible material such as paper, plastic or the like, as the material is wound upon or unwound from a storage or mill roll; and more particularly it relates to a semiautomatic controller therefor.

It is the general object of the present invention to provide a device which operates semiautomatically to control the brake or clutch torque applied to the core or shaft of such storage roll as the roll diameter decreases or increases in an unwinding or winding operation. It is a further object of this invention to provide such a controller which is adaptable to varying torque requirements during the processing of the material and is capable of handling a range of pressure changes as may be dictated by varying roll sizes, core diameters, web widths, and material tension needs; to provide such a controller which is of rugged construction, dependable in operation, simple to operate, adjustable under running conditions, easy to install and which is adapted for economical construction.

Other objects and advantages of the present invention will become more readily apparent from the following description and accompanying drawings, which show preferred embodiments of the invention, and such embodiments will be described; but it will be understood that various changes and modifications may be made from the construction disclosed, and that the drawings and description are not to be construed as defining or limiting the scope of the invention, the claims forming a part of this specification being relied upon for that purpose.

In winding or unwinding material from a mill roll of material such as paper, plastic or the like upon a core or shaft such as a mandrel as required in many industrial and commercial operations, the mill roll is generally positioned in a stand adapted to receive the extending ends of the core or shaft and is provided with a clutch or brake which acts upon such core or shaft to control the rate of rotation of the roll thereby controlling the linear velocity of the web as it is unwound or wound under a predetermined tension. Such stands are generally operated by manually controlled brake means. It is apparent, particularly in an unwinding process that when the brake torque is not varied proportionate to roll diameter change, both web tension and brake heat increases and may exceed tolerable limits, possibly resulting in web breakage or brake damage that may range from accelerated lining wear to failure of major components. In any case, such operation generally results in needless maintenance costs and production downtime losses. It is obvious that given a constant linear velocity of the web as it is drawn from the mill roll for processing, the roll diameter will change as the material is unwound; and that because of the reducing roll diameter, the angular velocity, or r.p.m., of the roll must be continually increased during an unwinding operation. Similarly, it must be continually reduced during a winding operation.

It is therefore apparent that failure to regulate carefully the brake or clutch pressure acting upon the core of the mill roll will, in an unwinding operation, cause probable damage to the material as a result of increased web tension and to the brake due to the heat build-up therein. Similarly in a winding operation, web damage is the probable result from increased web tension if the angular rotation or r.p.m. of the mill roll is not reduced proportionately with increased roll diameter.

The present invention relates to a semiautomatic device for controlling the pressure applied by the brake on a mill roll stand to vary the angular rotation or r.p.m. of the mill roll during an unwinding operation to maintain a constant web tension and linear speed.

Referring now to the drawings:

FIG. 1 is a front elevational view of the controller of the present invention showing the follower arm and roller positioned on a material mill roll with the web withdrawn therefrom.

FIG. 2 is a side elevational view thereof of the controller with the arm and roller removed.

FIG. 3 is a partial sectional view taken substantially along line 3—3 of FIG. 2; and FIG. 4 is a schematic perspective view illustrating the functional relationship of the essential features of the controller of the present invention, with the follower arm and roller positioned on a mill roll of material with the web being withdrawn for processing.

In the drawings, FIGS. 1 through 4 illustrate a controller 10 having a shaft 12 supported for rotative movement in a housing 14 with one end 15 thereof extending outwardly through an opening in the housing to receive an elongated follower arm 16 adjustably, but nonrotatably, secured to the projecting end 15 of the shaft 12. The arm 16, which may take particular forms depending upon individual processing requirements, is provided with a roller 18 rotatably attached to its terminal portion 20, as shown. The arm 16 and roller 20 are arranged and constructed to permit the roller to rest or ride upon the side of a mill roll 22 comprising a continuous length of flexible material such as plastic sheet, paper, fabric or the like wound upon a cylindrical mandrel or core 24. The roller rests on the roll as a web 26 is drawn therefrom for processing. For purposes of illustration, the controller is shown and described in connection with an unwinding process. It is to be understood, however, that the present device is equally suitable for use in a winding operation.

As is well known to those skilled in the art, during an unwinding operation the roll 22 is supported in an unwind stand (not shown) which receives the mandrel or core upon which the material is wound. Such a stand is generally provided with a clutch or brake 28, operatively associated with the core 24 and shown schematically in FIG. 4, by which the rate of rotation of the roll may be controlled so as to regulate the linear speed of the web being withdrawn therefrom and, if required, to place the web under tension during the unwinding operation.

An eccentric cam 30 is nonrotatably keyed to the interior portion of the shaft 12 for rotative movement therewith within the housing 14. The cam is arranged to engage an elongated lever arm 34 of generally rectangular cross section. The arm 34 bears upon the cam 30 intermediate its ends and is secured to the wall of the housing 14 by a pivot bolt 36. The pivot bolt extends through a suitable mounting hole in one end of the arm 34 permitting limited pivoted movement of the arm within the housing responsive to rotative movement of the eccentric cam 30.

An operating link 38 is provided and is arranged for abutting engagement with the lever arm 34 for coplanar movement therewith. The link is carried within the housing on an elongated, normally linearly extending screw assembly 40 which comprises an adjusting shaft 42 rotatably mounted in an opening in the wall of the housing 14 and carried thereby with a free end extending outwardly of the housing. The opposite or inner end of the shaft is nonrotatably secured to a threaded rod 44 by a universal coupling 46 to permit the threaded rod to rotate with the shaft 42 while permitting lateral movement of the rod with respect to the shaft 42 responsive to pivotal movement of the first lever arm 34. The link 38 is carried on the rod 44, as shown, being received through a substantially centrally located threaded opening. As the opening is internally threaded, relative rotation between the link and rod permits longitudinal adjustment of the link thereon. To this end the outwardly extending portion of the shaft 42 is adapted to receive a manually operated adjustment wheel by which the screw assembly 40 may be rotated. By suitable coupling means (not shown), the exterior end of the shaft 42 may be attached to an electric motor 52 replacing the adjusting wheel 48, permitting remote actuation thereof to rotate the shaft and hence the threaded rod 44 for positioning the link longitudinally thereon.

The link 38 obviously may take many forms, but for purposes of illustration it is shown as essentially an elongated, substantially rectangular solid, with opposed ends 54 and 56 struck on a predetermined radius to provide curved surfaces whereby there will essentially be only a single line of contact between the abutting surfaces of the first arm 34 and the link as well as between the abutting surfaces of the link and a second lever arm 58. The arcuate ends of the link are also recessed to form U-shaped transverse channels therethrough as shown in FIG. 4 within which the first and second arms, respectively, are slidably received. The opposed sides of each channel are formed to embrace the sides of the respective lever arms thereby preventing rotation of the link upon rotation of the rod 44, causing it instead to move longitudinally on the rod.

The second lever arm 58 is also pivotally secured to the housing by a pivot bolt 60 which extends through a mounting hole in the arm intermediate its free ends 62 and 64. The pivot bolts 36 and 60 have substantially parallel axes and are spaced apart within the housing on opposite sides of the rod 44 and longitudinally with respect to said rod thus permitting the link 38 to be operatively positioned on the rod longitudinally intermediate the pivot bolts with the free end 62 of the second arm slidably received in the channel of the end 56, as shown.

It will be apparent to those skilled in the art that the arm 58 is therefore arranged to pivot or rock coplanar with the arm 34 and link 38 about the bolt 60, actuated by movement of the arm 34 transmitted through the operating link 38 as the cam 30 rotates responsive to changes in the diameter of the mill roll 22.

The end 64 is provided with an elongated adjusting screw 66 received in a threaded opening extending laterally through the arm 58. To utilize the full lever magnitude, the said opening is preferably formed adjacent to the end of the arm 58, as shown. The adjusting screw may be locked in adjusted position by conventional means such as a lock nut 68.

An enlarged head or abutment surface 70 is formed as shown on the screw 66 and arranged to engage the stem 72 of a fluid pressure regulator or valve 74, shown schematically in FIGS. 3 and 4. The valve 74 may be of the type generally and commercially available in which the stem 72 is adapted to reciprocate to vary the output presure therefrom. In the valve 74 illustrated, the output pressure decreases by applying a force to depress the stem and increases upon removal of the force to permit the stem to extend fully. Suitable ports and fittings 76, 76 are provided in the wall of the housing to provide the necessary connections between the valve 74 and the brake 28, and also between the valve and a remote pressure source (not shown).

In an unwinding operation the controller of the present invention is suitably positioned to permit the follower arm 16 and roller 18 to ride upon the mill roll of material as the web is drawn therefrom for processing. The position of the cam 30, nonrotatably secured to the shaft 12, is arranged so that initially the point of least radius thereof engages the arm 34. This can be readily accomplished by conventional means such as aligning score lines on the cam and lever arm from within the housing or by aligning similar score lines or other indicia (not shown) on the exterior end 13 of the shaft 12 and adjacent the outer surface of the housing. The starting presure delivered to the brake through the valve 74 for any given process and position of the roller on the mill roll may be preset by adjusting the screw 66 to move the head 70 toward or away from the stem 72 of the valve 74. This can be conveniently accomplished by use of appropriate tools which may be inserted through an access opening 78 in the housing 14. Ordinarily, for any given installation, adjustment of the screw 66 will not again be necessary but can be conveniently accomplished should it be required. To set the desired rate of change of output pressure from the valve 74 to the brake 28, as for example in pounds per square inch per degree of rotation of the cam 30, the operating link 38 is positioned longitudinally on the threaded rod 44 merely by rotating the adjusting wheel 48 in order to obtain the desired magnitude of lever arm movement per degree of rotation of the cam. It is apparent that as the link 38 is positioned outwardly on the rod 44 the magnitude of movement of the lever arm 58, as shown in FIG. 4, is increased with each degree of rotation of the cam 30 as the radius of the periphery thereof increases.

It should be noted that the angular relation of the arm 16 with respect to the point of smallest radius on the periphery of the cam 30 will necessarily vary in accordance with the initial diameter of the mill roll 22. As shown and described, the cam is initially set with its point of smallest radius abutting the arm 34 and the follower arm 16 is rotatively adjusted on the extending end 13 of the shaft 12 to permit the roller 18 to rest on the side of the mill roll. By fixing the arm to the shaft with a set screw or the like to prevent relative rotation therebetween, the arm, shaft and cam then rotate together as the diameter of the roll decreases during unwinding. As the web 26 is withdrawn from the mill roll 22 for processing, the brake pressure delivered to the brake 28 from the regulator or valve 74 places the web under a predetermined desired tension. It is readily apparent that for a constant tension and linear speed of the web, the r.p.m. of the core must increase as material is drawn from the roll and the diameter thereof is reduced. If the brake pressure applied to the core remained constant, the tension of the web would obviously increase causing possible web damage as well as possible brake damage. However, in the present invention, the follower arm and attached shaft 12 rotate in response to the decreased diameter of the mill roll, causing like rotation of the cam 30. As viewed in FIG. 4, such counterclockwise rotation of the cam moves the arm 34 clockwise about the pivot bolt 36 and the link 38 transmits such movement to the arm 58 which is rotatively moved about the pivot 60 in a clockwise direction causing the end 64 thereof carrying the screw 66 to depress the stem 72 of the valve 74. As the stem 72 is depressed, the valve output pressure permitted to pass to the brake 28 is therefore varied to permit an increased core r.p.m. whereby the tension of the web will remain at the predetermined, desired level and at a constant linear web speed as required for processing.

While I have shown and described the present invention in connection with an unwinding operation, those knowledgeable in the art will readily recognize that it is equally suitable for a roll winding process by merely adjusting the cam 30 on the shaft 12 whereby its periphery initially abuts the arm 34 at its point of maximum radius, thereby reversing the above-described action of the controller to cause automatic reduction of core r.p.m. as the mill roll is wound and its diameter increases.

If it should be desired, the manual adjusting wheel 48 may be replaced by electric motor 52 suitably connected to the shaft 42 and provided with suitable circuitry to permit actuation of the motor as desired to rotate the screw assembly 40 to adjust the link longitudinally on the rod 44. When using the motor 52, it is desirable that the circuitry employed include spaced means such as limit switches 80 and 82 suitably mounted whereby they may be actuated by the link 38 to limit the travel of the link on the rod 44. The provision of such means would prevent possible damage to the controller or to the motor. When manually operated, the screw assembly 40 is provided with a stop nut 84 or the like as shown in FIG. 4 to limit travel of the link in one direction, while the coupling 46 limits travel in the other.

Similarly, the present invention may be provided with a pressure gauge (not shown) connected to the valve 74 to permit a direct reading at all times of the output pressure applied to the brake 28. Also a turns counter (not shown) may be attached to the screw assembly 40 to facilitate initial adjustment of the link 38 on the threaded rod 44 and any additional adjustment thereof which may be desirable or required during a winding or unwinding operation.

The invention claimed is:

1. A controller for automatically regulating the brake torque applied to a mill roll of flexible material to vary the rate of rotation of the roll as the diameter changes during a winding or unwinding operation to regulate the web tension and lineal speed of the material comprising a shaft mounted for rotative movement and a follower arm nonrotatively carried by said shaft and adapted to engage the roll of material for movement in response to changes in the diameter thereof, a cam also secured to the shaft for rotative movement therewith responsive to movement of said follower arm, a first pivotally supported lever arm operatively associated with the cam to pivot in response to rotative movement of the cam, a second lever arm supported for pivotal movement in response to rotative movement of the cam, means connecting the first and second lever arms to transmit movement of the first arm to the second arm whereby the magnitude of movement transmitted from the first arm to the second arm may be adjusted, and regulating means actuated by and associated with the second lever arm to regulate the brake torque applied to the roll to vary the rate of rotation thereof.

2. The controller set forth in claim 1 wherein the means connecting the first and second lever arms comprises an elongated rod disposed intermediate the lever arms, and including an operating link supported by the rod operatively engaging and spacing apart the levers, said link being adjustably positionable longitudinally on the rod permitting adjustment of the magnitude of movement transmitted from the first arm to the second arm.

3. The controller set forth in claim 2 wherein the elongated rod is rotatably supported and includes a threaded portion, said link being supported on said threaded portion whereby rotation of the rod effects longitudinal adjustment of the link thereon and means on said link associated with said levers acting to prevent rotation of the link with said rod.

4. A controller for automatically regulating the brake torque applied to a mill roll of flexible material to vary the rate of rotation of the roll as the diameter changes during a winding or unwinding operation to regulate the web tension and lineal speed of the material comprising a shaft mounted for rotative movement and a follower arm nonrotatively carried by said shaft and adapted to engage the roll of material for movement in response to changes in the diameter thereof, a cam also secured to the shaft for rotative movement therewith responsive to movement of said follower arm, a first lever arm supported for pivotal movement in a plane normal to the axis of said shaft and operatively associated with the cam to pivot in response to rotative movement of the cam, a second lever arm supported for coplanar pivotal movement with said first lever arm, means connecting the first and second lever arms to transmit movement of the first arm to the second arm and comprising an elongated rod disposed between the lever arms and adapted for coplanar pivotal movement therewith, and including an operating link operatively engaging said first and second lever arms and adjustably supported on the rod for longitudinal positioning thereon between the said lever arms to vary the magnitude of movement transmitted from the first lever arm to the second lever arm, and regulating means actuated by movement of the second lever arm and operatively associated therewith to regulate the brake pressure applied to the roll to vary the rate of rotation thereof, the degree of brake applied by said regulating means being proportionate to the magnitude of movement of said second lever arm.

5. The controller set forth in claim 4 wherein the elongated rod is rotatably supported and includes a threaded portion, said link being supported on said threaded portion whereby rotation of the rod effects longitudinal adjustment of the link thereon and means on said link associated with said levers acting to prevent rotation of the link with said rod.

References Cited by the Examiner

UNITED STATES PATENTS

| | | | |
|---|---|---|---|
| 1,122,878 | 12/1914 | Dowler | 242—75.45 |
| 1,652,299 | 12/1927 | Carpenter | 242—75.45 X |
| 2,680,573 | 6/1954 | Monkley | 242—74.5 X |

FRANK J. COHEN, *Primary Examiner.*

STANLEY N. GILREATH, N. L. MINTZ,
*Assistant Examiners.*